Sept. 15, 1942.  H. HOLLIS  2,295,898
SIDE DISK TERRACING MACHINE
Filed July 16, 1941   3 Sheets-Sheet 1
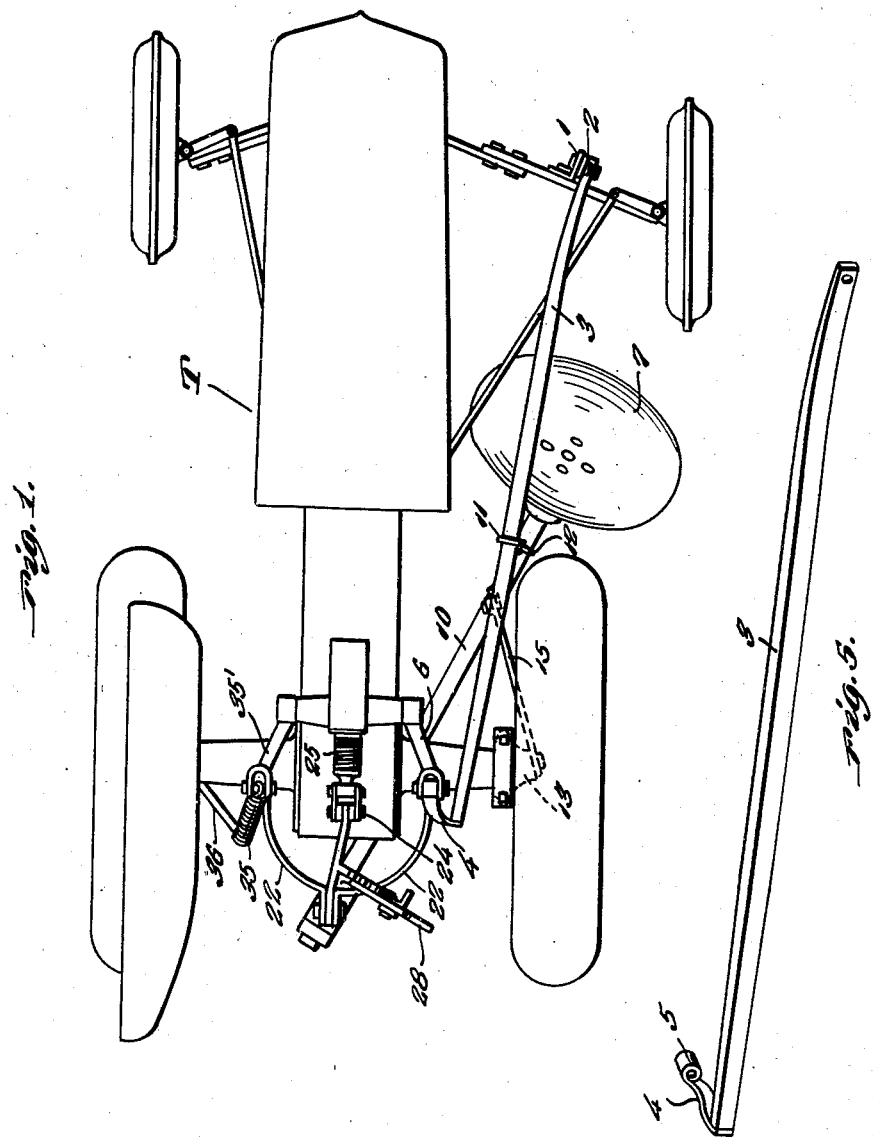
Inventor
Homer Hollis
By Clarence A. O'Brien
Attorney

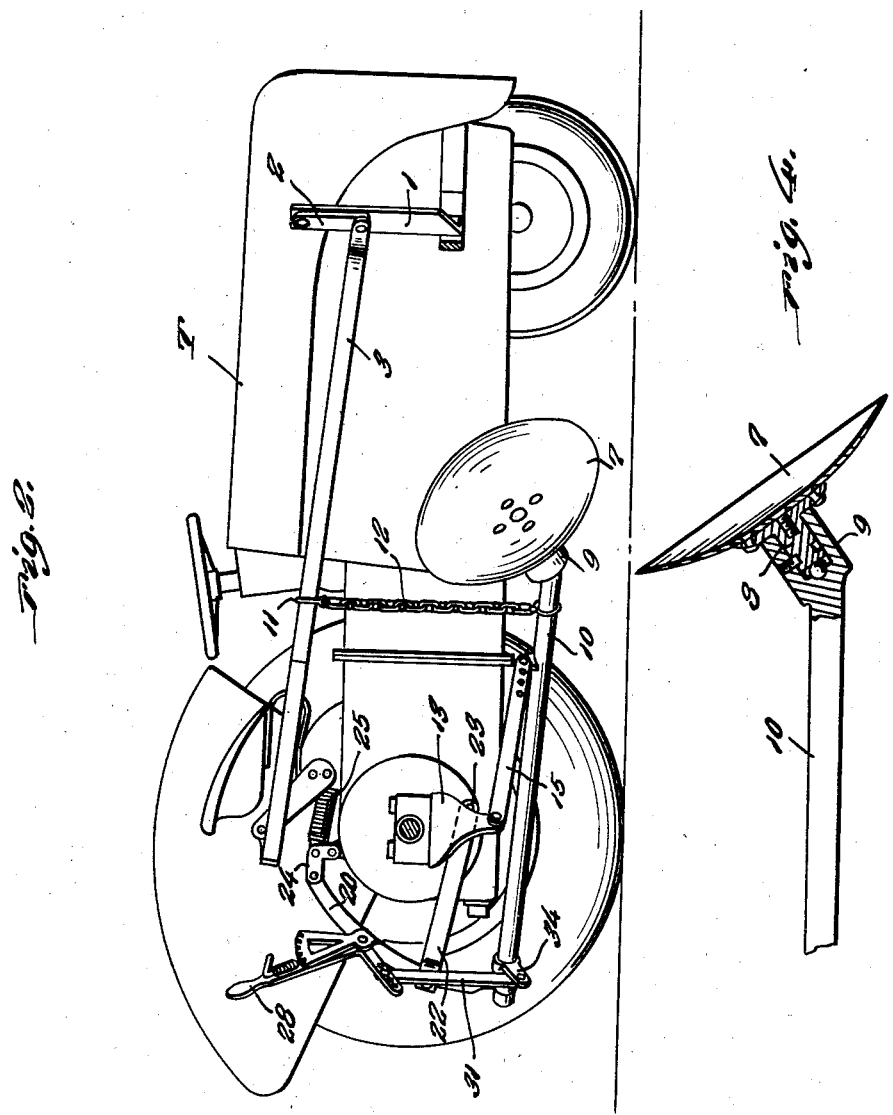

Sept. 15, 1942.  H. HOLLIS  2,295,898
SIDE DISK TERRACING MACHINE
Filed July 16, 1941  3 Sheets-Sheet 3
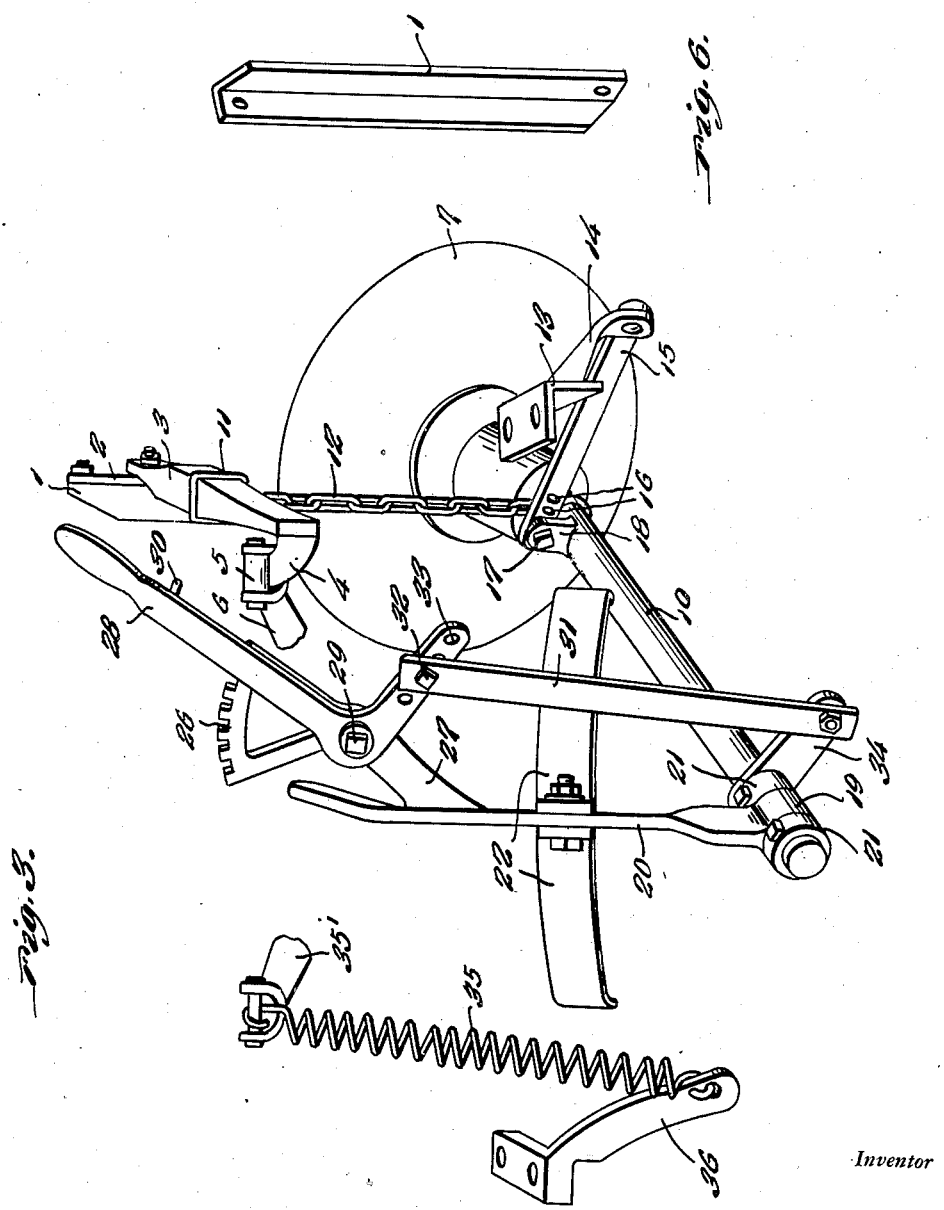

Patented Sept. 15, 1942

REISSUED
APR 18 1944

2,295,898

UNITED STATES PATENT OFFICE 2,295,898

SIDE DISK TERRACING MACHINE

Homer Hollis, Lillie, La.

Application July 16, 1941, Serial No. 402,673

4 Claims. (Cl. 97—47)

This invention relates to a terracing machine, the general object of the invention being to provide a disk plow so supported that it operates between the front and rear wheels of a tractor or four wheel vehicle, with means for adjusting the parts to different positions.

This invention also consists in certain other features of construction and in the combination and arrangement of the several parts to be hereinafter fully described, illustrated in the accompanying drawings and specifically pointed out in the appended claims.

In describing the invention in detail, reference will be had to the accompanying drawings, wherein like characters denote like or corresponding parts throughout the several views, and in which:

Figure 1 is a top plan view of a tractor showing the invention in use thereon.

Figure 2 is a side elevational view of Figure 1 with parts of the tractor omitted.

Figure 3 is a diagrammatic view of parts of the invention removed from the tractor.

Figure 4 is a fragmentary sectional view showing how the disc is connected to its supporting shaft.

Figure 5 is a view of the supporting beam.

Figure 6 is a view of the upright to which the front end of the beam is connected.

In these views the letter T indicates a tractor and in carrying out the invention an upright member 1 is fastened to the front axle of the tractor at one side thereof and a link 2 is pivoted at the upper end of this member 1 and the front end of a beam 3 is pivoted to the lower end of the link so that the beam can be moved forwardly and rearwardly and also rocked on the pivots. The rear end of the beam is formed with a laterally extending arm 4 which has a sleeve 5 thereon which is connected to an arm 6 forming part of the hydraulic lift means of the tractor or if the tractor does not have this hydraulic lift means then the beam can be raised and lowered by other means.

The disk plow is shown at 7 and has its shank 8 rotatably arranged in a socketed part 9 of a shaft 10, the part 9 being arranged at an angle as shown more particularly in Figure 4. A collar 11 encircles a part of the beam 3 and can be adjusted toward and away from the center of the beam and a chain 12 or other flexible member depends from the collar and is connected to the shaft 10 so that this flexible member 12 suspends the front end of the shaft 10 from the beam 3. A bracket 13 is fastened to a side part of the tractor, preferably the rear axle thereof at one end thereof and has an arm 14 thereon to which is pivoted a bar 15 the other end of which is provided with a plurality of holes 16 any one of which is adapted to receive a bolt 17 which passes through an ear 18 on the shaft 10. The bar 15 in its assembled position serves as a tension brace to prevent the plow 7 from being pushed sidewise under the tractor due to the reaction of the dirt on the plow 7. Also because of its special position it increases the backward thrust on shaft 10 to further facilitate the operation of the controls. The other end of the shaft loosely fits in a ring 19 formed on the lower end of a member 20, collars 21 fastened to the shaft 10 holding the said end of the shaft in position in the ring 19. Arcuate members 22 are fastened to an intermediate part of the member 20 and the front ends of these arcuate members 22 are fastened to rear portions of the tractor as at 23 so that these members 22 can swing upwardly and downwardly. The upper end of the member 20 is connected by the clevis 24 with the spring member 25 supported from a part of the hydraulic means and a quadrant 26 is attached by a bracket 27 to a part of the member 20 and a hand lever 28 is pivoted to the bracket 27 as at 29 and has a detent 30 cooperating with the teeth of the bracket. A bar 31 has its upper end adjustably connected with the lever 28 by a bolt 32 engaging any one of a row of holes 33 in the lever and the lower end of the bar is pivoted to an arm 34 connected with the inner collar 21 so that by adjusting the lever 28 the shaft can be turned or rocked to adjust the disk 7. The numeral 35 indicates a spring connecting the arm 35' of the hydraulic means with a bracket 36 attached to a rear part of the tractor. This spring tends to move the hydraulic arms downwardly to cause the plow to engage the soil.

Thus by adjusting the beam 3 by means of the hydraulic means the shaft 10 and the disk can be raised and lowered to govern the plowing depth or to raise the disk entirely clear of the ground when it is desired to transport the apparatus from one position to the other. The disk can also be adjusted through means of the hand lever 28 to provide the right plowing angle for the disk in relation to the tread line of the tractor. The bar 15 will permit free up and down movement of the shaft 10 but holds it in fixed position against any movement to either side. By changing the cutting angle of the disk through means of the lever 28 the furrow or the dirt to be moved by the disk is regulated.

Attention is directed to the fact that since the forward end of the beam 3 is supported at a point close to the right forward wheel, as shown in Figure 1, the motion of the right forward wheel is carried to the beam 3 substantially unmodified by the motion of the left forward wheel. This feature is of a decided benefit since the forward right wheel is in line with the plow and serves as an advance detector of the contour of the earth to be plowed.

As will be seen pressure of the soil on the plow will tend to move the shaft 10 rearwardly and this movement is resisted by the spring means 25 acting on the upper end of the member 20, the lower end of which carries the rear end of the shaft.

While Figure 4 shows one manner of rotatably supporting the plow 7 with the front end of the shaft 10 it is to be understood that any other suitable means can be used for this purpose.

As the tractor moves along with the plow 7 entering the soil the friction of the soil against the plow will cause it to rotate and thus a furrow is formed in front of the rear wheel and the dirt is thrown to one side of the tractor, the parts being adjustable to make the furrow of varying depths and the plow will be caused to follow the contour of the ground as it follows the front right wheel which automatically raises and lowers the plow as the wheel passes over high and low parts of the ground. The angle of the plow can be adjusted by partly rotating the shaft 10 by means of the hand lever 28.

It is thought from the foregoing description that the advantages and novel features of the invention will be readily apparent.

It is to be understood that changes may be made in the construction and in the combination and arrangement of the several parts provided that such changes fall within the scope of the appended claims.

Having described the invention, what is claimed as new is:

1. In a four wheel vehicle, an upright extending from the front axle thereof at one side thereof, a beam having its front end pivotally and swingably connected with the top end of the upright, a shaft, a disk connected for rotary movement with the front end of the shaft, a member depending from the beam and connected with the front part of the shaft, means for rotatably supporting the rear end of the shaft, said shaft extending forwardly and outwardly with the disk located substantially between the front and rear wheels at one side of the vehicle and means for raising and lowering the beam.

2. In combination with a four wheel vehicle, an upright connected to the front axle thereof adjacent one side thereof, a link pivoted at its upper end to the other end of the upright, a beam having its front end pivotally connected with the lower end of the link, means for raising and lowering the rear end of the beam, a flexible member depending from the beam intermediate the ends thereof, a shaft having its front portion connected with the lower end of the flexible member, a disk rotatably connected with the front end of the shaft and arranged at an inclination to the shaft, means for rotatably supporting the rear end of the shaft with the shaft extending forwardly and outwardly with the disk arranged substantially between the front and rear wheels at one side of the vehicle and means for rocking the shaft.

3. In combination with a tractor having hydraulic lift means, an upright connected with the front axle of the tractor at one side thereof, a beam having its front end pivotally and swingably connected with the upper end of the upright, means for connecting the rear of the beam with the hydraulic means, a flexible member adjustably connected with an intermediate part of the beam, a disk carrying shaft having its front end connected with the lower end of the flexible member, the disk having its hub arranged at an inclination to the length of the shaft, means for holding the shaft against sidewise movement, means for rotatably supporting the rear end of the shaft, a hand lever connected with the tractor, and means actuated thereby for rocking the shaft to adjust the inclination of the disk.

4. In a cultivating vehicle having a forward and a rear axle, a lifting beam, movably connected to the forward axle and movably connected to the body of the cultivating vehicle, a shaft, a disk rotatably connected to the shaft, a lifting member connected to the shaft and the lifting beam, means for rotatably supporting the shaft, said shaft extending in a forwardly direction with the disk located substantially between the front and rear axles of the cultivating vehicle and means for raising and lowering the beam.

HOMER HOLLIS.